May 25, 1937. J. B. ARMITAGE 2,081,288
MACHINE TOOL TRANSMISSION AND CONTROL
Filed May 16, 1935 7 Sheets-Sheet 1

INVENTOR
Joseph B Armitage
BY Fred G Parsons
ATTORNEY

May 25, 1937. J. B. ARMITAGE 2,081,288
MACHINE TOOL TRANSMISSION AND CONTROL
Filed May 16, 1935 7 Sheets-Sheet 2

INVENTOR
Joseph B Armitage
BY
Fred G Parsons
ATTORNEY

INVENTOR
Joseph B Armitage
BY
Fred G Parsons
ATTORNEY

May 25, 1937. J. B. ARMITAGE 2,081,288
MACHINE TOOL TRANSMISSION AND CONTROL
Filed May 16, 1935 7 Sheets-Sheet 5

INVENTOR
Joseph B Armitage
BY Fred G Parsons
ATTORNEY

Patented May 25, 1937

2,081,288

UNITED STATES PATENT OFFICE 2,081,288

MACHINE TOOL TRANSMISSION AND CONTROL

Joseph B. Armitage, Wauwatosa, Wis., assignor to Kearney & Trecker Corporation, West Allis, Wis., a corporation of Wisconsin Application May 16, 1935, Serial No. 21,827

22 Claims. (Cl. 90—16)

This invention relates to machine tools and especially to milling machines.

An object of the invention is to provide a machine tool having improved structure, transmission, and control means adapted at least in part and in certain features of the improvements for use with machine tools generally, and in certain parts and features particularly adapted for use in milling machines, and especially for use in planer or bridge types of milling machines.

Another object is to provide an improved transmission and control means for such machines in which certain tool and work actuating portions of the transmission are provided with motor means individual thereto respectively, but the control mechanism of the machine is so constructed and interrelated that the operation of one of the individual motors is restricted by the control devices of the other motor, and more especially in a particular manner adapted for the operation of a milling machine.

Another object is to provide improved transmission and controls as mentioned in the preceding paragraph together with other means operative at times to overcome certain of the restrictions mentioned, whereby to then permit of control effects irrespective of the position or operation of certain of the restrictive control means.

A further purpose is to provide improved control means such as mentioned in the two last preceding paragraphs which are adapted for transmission mechanism in which the individual transmission motors are electrical.

A further purpose is to provide an improved milling machine transmission having separate and individual motors respectively for rotary tool movement and for relative movement of the work and tool together with improved control mechanism preventing such relative movement except when the tool is rotating to effect cutting of the work material.

A further purpose is to provide improved structure such as just mentioned in combination with other structure permitting of relative movement at certain rates irrespective of tool rotation while preventing relative movement at other rates.

Another purpose is to provide an improved construction and operation for a plurality of individually adjustable rotatable tool spindles, particularly adapted for a milling machine of the planer type, and to provide an improved supporting and actuating means therefor.

Another purpose is to provide an improved planer or bridge type of milling machine incorporating structure for some or all of the purposes previously mentioned.

Another purpose is to provide an improved multiple spindle milling machine, in which the various spindles each co-operate with a single work support but are independently and individually adjustable either as to position, rate or direction.

Another purpose is to provide an improved multiple spindle milling machine such as just previously mentioned, in which the several spindles derive power from a common transmission member.

Another purpose is to provide an improved spindle rate changing and reversing mechanism, particularly adapted for use with the spindles of a multiple spindle milling machine for individual control of the rate and direction of the different spindles.

A further purpose is to simplify and improve the construction, operation and control of machine tools and especially of milling machines, and still other purposes, objects and results will be apparent from this specification.

The invention consists in the construction herein illustrated, described and claimed and in such modifications of the structure illustrated and described as may be equivalent to the structure defined in the claims.

The same reference characters have been used to indicate the same parts throughout the specification and in the drawings in which.

The machine shown in the drawings is a milling machine of the so-called rail or planer type. The machine includes a work supporting table 1, Fig. 1, guided by any suitable form of mutual guide surfaces for reciprocatory movement on a bed or base 2, between a pair of side column or support members 3, 4, which are rigidly fixed with the bed and are rigidly fixed together at their upper ends by a connecting frame member 5; the bed 2 and members 3, 4, 5 together constituting a unitary main frame or support.

Figure 1:
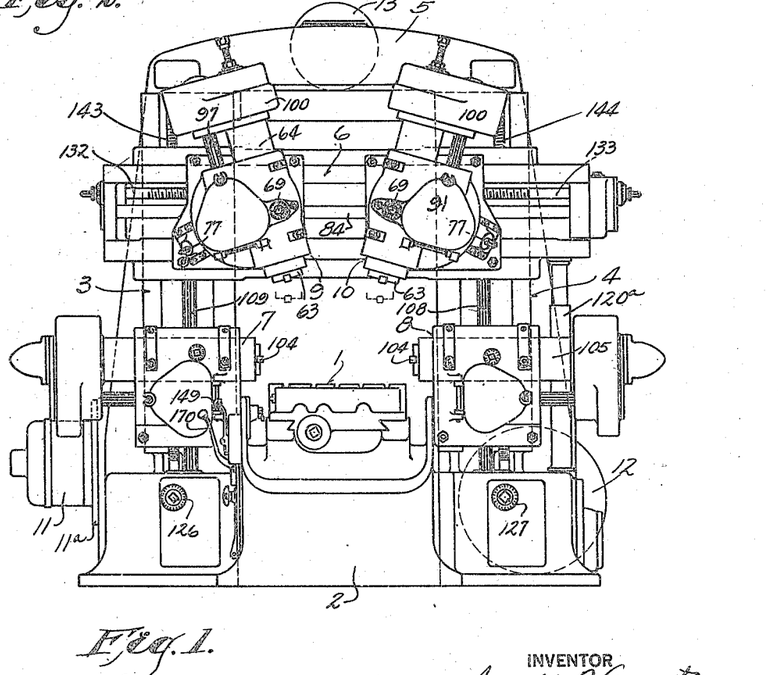
Fig. 1 is a view in end elevation of a multiple spindle milling machine in which the invention is incorporated.

Guided on side members 3, 4 for vertical adjustment is a rail or bridge 6. A plurality of spindle or tool support units 7, 8 are respectively guided on the side members 3, 4 for vertical adjustment. Other spindle or tool support units 9, 10 are each guided on rail 6 for horizontal adjustment and are simultaneously vertically adjustable bodily with the rail. The units 9, 10 each provide for angular or pivotal adjustment of the spindles carried thereby, and each of the spindles in each of the units 7, 8, 9, 10 is provided with means for axial adjustment, as will later be explained.

Supported by bed 2 at various points on the frame of the machine are a plurality of motors 11, 12, 13 respectively providing primary moving means for the table 1, for the several spindles of the units 7, 8, 9, 10, and for the vertical movement of rail 6.

Figure 5:
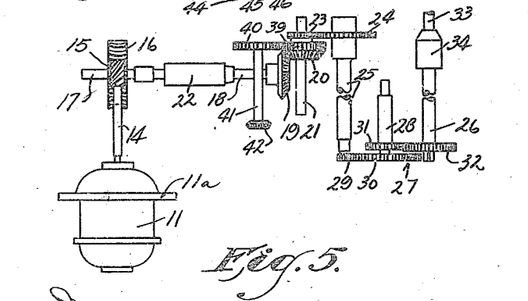
Fig. 5 is a sectional development of other portions of the transmission for the table shown in Fig. 1.
Figure 6:
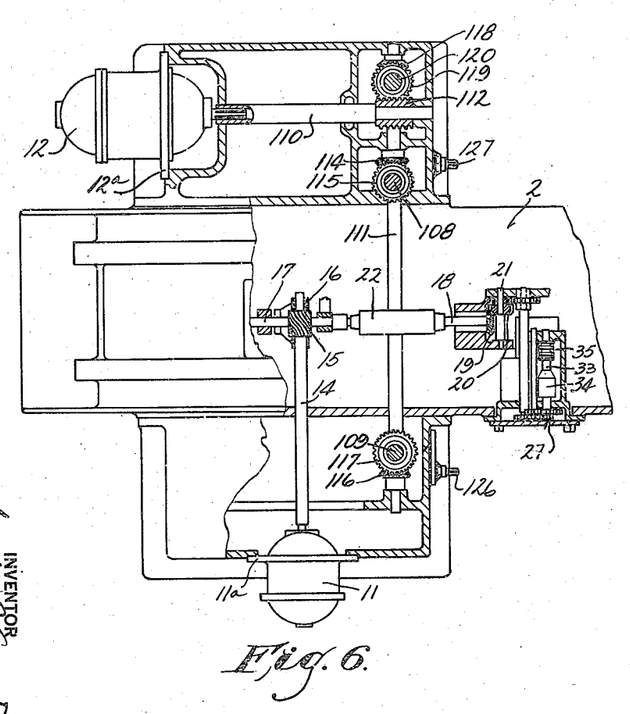
Fig. 6 is an enlarged partial top view, mainly in section, of the machine shown in Fig. 1 but with the table removed.

Table 1 is driven from motor 11, Figs. 1, 5, 6 which in this instance is electrical. Motor 11 is fixed with the main frame or support by a flange 11a. The transmission from motor 11 to table 1 is as follows:

The shaft of motor 11 is suitably coupled to drive a shaft 14, Figs. 5, 6 having fixed thereon a worm 15 meshing with a worm wheel 16 fixed on a shaft 17. A co-axial shaft 18 has fixed thereon a bevel gear 19 which meshes with a bevel gear 20 fixed on a shaft 21, the shafts 17, 18 being connected by an overload or safety coupling unit generally denoted by the numeral 22, which may be of any of a number of well known forms and therefore need not be described in detail. The coupling 22 operates to cushion the transmission somewhat at all times and to interrupt the transmission during an overload, whereby to prevent damage or breakage but takes up its driving connection again when the load is reduced. The shaft 21 drives different branch line transmissions including a feed rate train and a relatively fast running rapid traverse train, either of which may alternatively actuate table 1.

Figure 7:
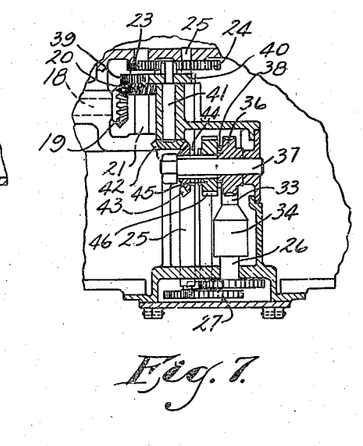
Fig. 7 is an enlarged sectional view of a portion of the mechanism shown at the right of Fig. 6, together with some associated mechanism.

The feed rate branch of the table transmission includes a gear 23, Figs. 5, 7, fixed on shaft 21 which meshes with a gear 24 fixed on a shaft 25. Shaft 25 drives a shaft 26 through a rate changer generally denoted by the numeral 27 and which includes an intermediate shaft 28 and a plurality of reversible and interchangeably replaceable gear pairs such as the gear pair 29, 30 and the gear pair 31, 32. Shaft 26 drives a co-axial shaft 33 through a feed train safety coupling 34 substantially similar in operation and construction to the coupling 22. Shaft 33 has fixed therewith a worm 35, Fig. 4, which drives a worm wheel 36, Figs. 4, 7 supported for independent rotation on a shaft 37, and having fixed therewith clutch elements such as 38 which form terminal elements for the feed branch train.

The quick traverse rate branch of the table transmission includes a gear 39, Figs. 5, 7 fixed on shaft 21, which meshes with a gear 40 fixed on a shaft 41. A bevel gear 42, also fixed on shaft 41, meshes with a bevel gear 43, Figs. 4, 7, which is supported for independent rotation on shaft 37, and is provided with clutch elements, such as elements 44, which form terminal elements for the quick traverse branch train.

Figure 4:
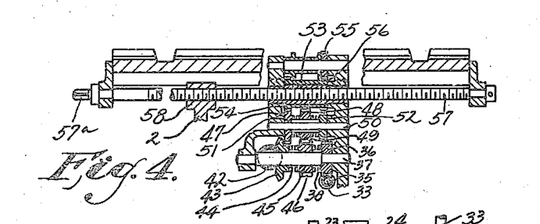
Fig. 4 is a sectional development of the table end of a transmission for driving the work table shown in Fig. 1.

Alternatively actuable from the terminal clutch elements 38, 44, Fig. 4, is a clutch member 45, supported for axial shifting and independent rotation on shaft 37. Clutch member 45 has clutch teeth respectively at its opposite ends adapted to engage the different terminal elements of the feed and quick traverse trains. A gear 46 fixed with clutch member 45 drives a table reverser and interruptor generally denoted by the numeral 47, Fig. 4, through a gear 48 meshed with gear 46 and fixed with a reverser clutch member 49 which is supported for independent rotation on a shaft 50. Clutch member 49 is axially movable for alternative engagement of clutch teeth respectively at its opposite ends with complementary clutch elements respectively fixed with gears 51, 52 which are each supported for independent rotation on shaft 50, and respectively connected for opposite rotation of a sleeve 53, the drive from gear 51 being through a gear 54 meshed with gear 51 and fixed on sleeve 53, and the drive from gear 52 being through an intermediate gear 55 to a gear 56 fixed on sleeve 53. The clutch member 49 also has an intermediate disengaged position interrupting the drive to the sleeve 53. Slidably keyed with sleeve 53 is a table screw 57 which is rotatably supported but fixed against axial movement relative to the table 1 and which engages a nut 58 fixed in bed 2.

The table transmission mechanism described provides table movement selectively at any of a variety of feed rates, or alternatively at a quick traverse rate according to the position of clutch member 45, and in either direction according to the position of reverser clutch member 49, which may also be positioned to stop the table.

The table 1 may be manually adjusted, at times when the reverser clutch 49 is in central or neutral position, by a hand crank (not shown)

applied to the squared end 57a, Fig. 4, of table screw 57.

The spindle units 9, 10, Fig. 1, are similar to one another in construction except for the differences which arise from their right and left hand disposition on rail 6. Only the unit 9 will be described in detail.

Figure 8:
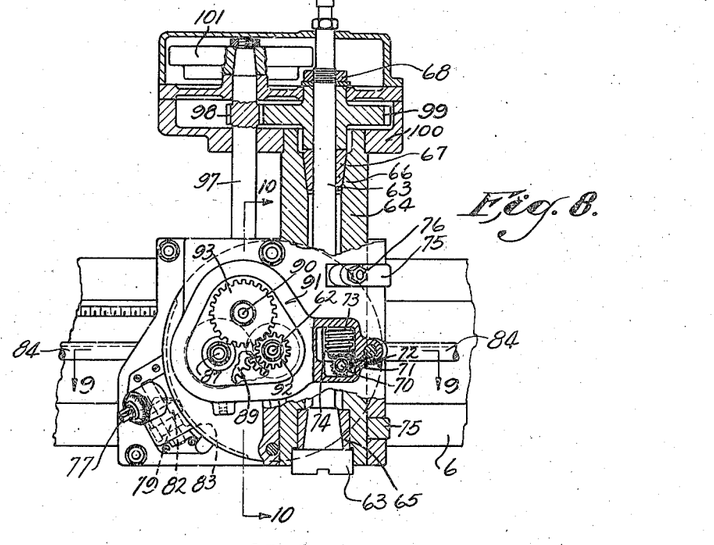
Fig. 8 is an enlarged view in elevation, partly in section, of a spindle unit shown at the upper left in Fig. 1, here shown with the spindle in vertical position.
Figures 9, 10:
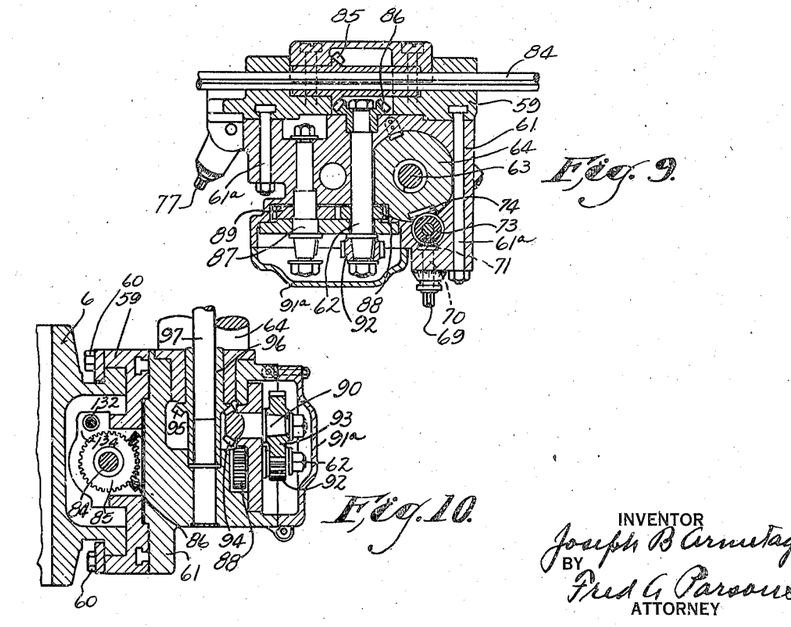
Fig. 9 is a partial view in horizontal section taken along line 9—9 of Fig. 8.
Fig. 10 is a partial view in vertical section taken along line 10—10 of Fig. 8.

Referring to Figs. 8, 9, 10, 11 the spindle unit 9 includes a saddle or member 59 guided for horizontal movement on rail 6 by any suitable slide surfaces, such for instance as shown in Fig. 10 and provided with suitable clamps operated by means such as bolts 60, 60. A block member 61 is pivoted on saddle 59, to swivel about the axis of a shaft 62, and may be clamped by bolts such as 61a, fitting a circular T slot in the saddle. The members 59 and 61 together provide a unitary carrier for a cutter spindle or support member 63 which is carried by a quill member 64 slidably keyed in member 61.

The spindle 63, Fig. 8, is mounted in suitable bearings such as bearings generally denoted by numerals 65, 66, preventing axial or lateral displacement relative to quill 64 and adjustable to take out all looseness upon adjustment of the bearing member 67 by the means of a nut 68, the bearing member 67 being slidably keyed with the spindle. The quill 64 may be adjusted by the means of a crank (not shown) applied to the squared end 69 of a shaft 70 having fixed thereon a bevel gear 71 which meshes with a bevel gear 72 fixed with a worm 73 engaging a rack 74 fixed with the quill. The quill may also be clamped against axial movement by members such as 75, 75, Fig. 8, and clamp screws such as 76.

Figure 11:
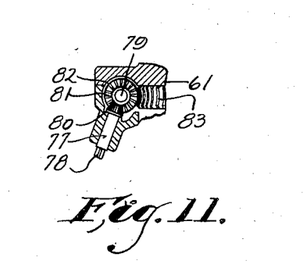
Fig. 11 is a developed sectional view of a portion of the mechanism shown at the lower left of Fig. 8.

For swivelling the block member 61, Fig. 9, of the unit 9 there is provided a shaft 77, Figs. 8, 11, having an end 78 squared to receive a crank (not shown), and connected with a shaft 79 through bevel gears 80, 81. Fixed on shaft 79 is a worm 82 meshed with a worm wheel segment 83 cut on or fixed with the block member 61.

The spindles of the spindle units 9 and 10, Fig. 1, are each driven through spindle transmission mechanism, which is similar for both units so far as it is individual to the different units, and except as it is relatively reversed to suit the right and left hand arrangement of the units, and is as follows for the unit 9. A drive shaft 84, Figs. 1, 8, etc., is rotatably supported from rail 6 and bodily vertically movable therewith, and provides a common drive shaft for the spindles of both the units 9 and 10. A bevel gear 85, Fig. 9, is rotatably carried by the saddle 59 and slidably keyed with shaft 84 and drives the shaft 62 through a bevel gear 86 fixed thereon.

Shaft 62 drives an axially parallel shaft 87 through a pair of permanently meshed gears 88, 89. The shafts 62 and 87 are, therefore, driven in opposite directions of rotation. Either shaft may drive a shaft 90, Figs. 8, 10, which is equally distant from each shaft 62, 87, through a rate changer generally denoted by numeral 91, Fig. 8, and consisting of removably reversible and interchangeable gear pairs such as the gear pair 92, 93, a plurality of such pairs being provided each having a different ratio of relative diameters. The rate changer 91 together with the shafts 62, 87, 90 constitutes a reverser, which drives shaft 90 in the one or the other direction accordingly as the driving gears of the rate change pairs 92, 93 are positioned on the one or the other of drive shafts 62, 87. The ends of the reverser and rate changer shafts are exposed to receive the gear pairs underneath a hinged cover 81a, Fig. 9, which provides ready access thereto.

The shaft 90, Figs. 8, 10 drives spindle 63 of unit 9 through bevel gears 94, 95, a sleeve 96, a shaft 97 co-axial with the sleeve and slidably keyed therewith to form an extensible coupling, and a pinion 98 fixed on shaft 97 and engaging a gear 99 fixed on spindle 63, the shaft 97 and pinion 98 being journaled in a housing member 100 fixed on quill 64 to be adjustable axially with the quill and spindle. Also fixed on shaft 97 is a fly wheel member 101.

The spindle units 7, 8, Fig. 1, are similar to one another in structure, except for the differences which arise from their respective right and left hand arrangement on the opposite side frame elements 3, 4. Only the unit 8 need therefore be described in detail.

Figure 12:
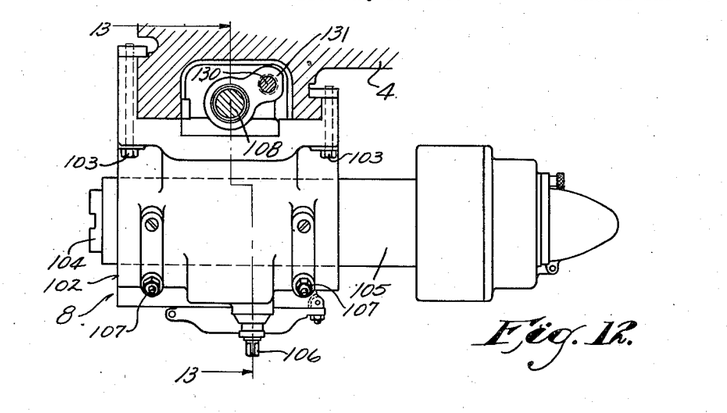
Fig. 12 is an enlarged top view of a spindle unit shown at the lower right of Fig. 1.

Referring to Fig. 12, unit 8 includes a unitary carrier member 102 guided on the side member 4 by suitable mutual slide surfaces such, for instance, as shown, and clampable by suitable means operated by bolts such as the bolts 103. Carrier 102 rotatably supports a tool spindle or support 104, mounted for axial movement in a quill 105, the quill being movable by the means of a hand crank (not shown) applied to the squared end of a shaft 106, and clamped by bolts such as 107, the quill adjusting and clamping devices being identical in form and operation with those already described for the quill 66 of the spindle unit 9. Spindle 104 is driven from a vertical drive shaft 108, there being a corresponding drive shaft 109, Fig. 1, associated with the side member 3 and corresponding unit 7.

Figure 13:
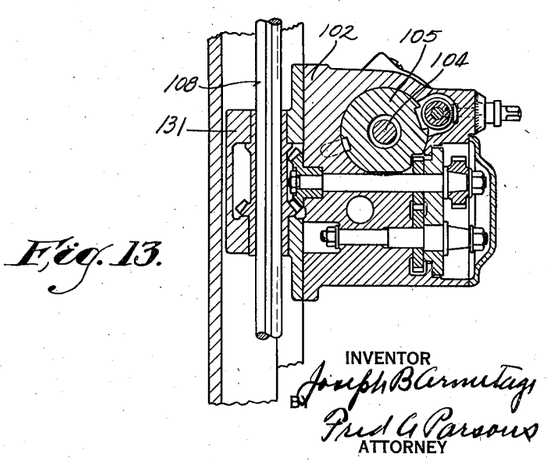
Fig. 13 is a partial view in vertical section taken approximately along line 13—13 of Fig. 12.

A spindle transmission connects the drive shaft 108, Fig. 12, for rotation of spindle 104, the transmission including gearing, reverser and rate change means, extensible coupling means etc., substantially identical in all its elements and functions with the spindle transmission connecting shaft 84 with the spindle 63 of unit 9 as previously described. This transmission is shown, in part, in Fig. 13.

Figure 3:
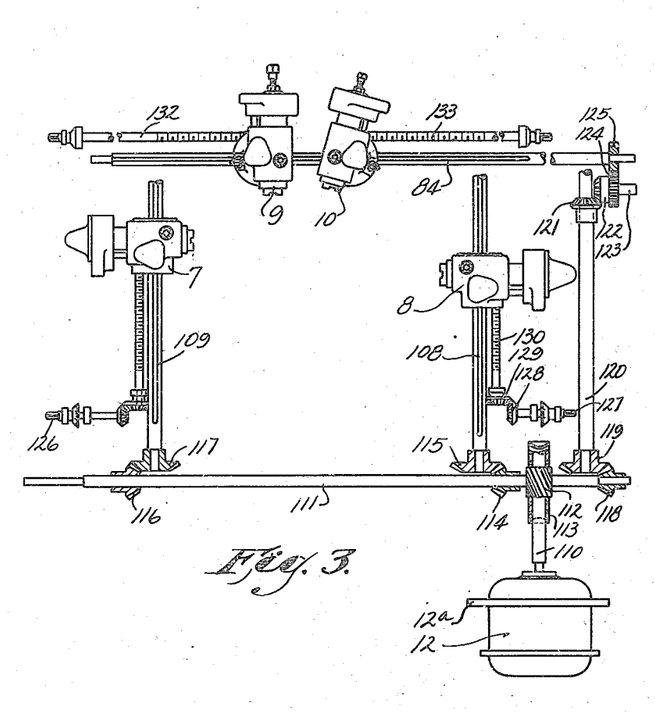
Fig. 3 is a semi-diagrammatic reduced scale view of certain spindle units shown in Fig. 1 together with some of the spindle rotating and adjusting mechanism therefor.

Each of the spindles of the units 7, 8, 9, 10 is driven from motor 12, Figs. 1, 3, 6, which in this instance is electrical and which has a flange 12a for fixing the motor to bed 2. The motor shaft is suitably coupled to a shaft 110, which drives a cross shaft 111 through a worm and worm wheel 112, 113, the shaft 111 driving the vertical shafts 108, 109 respectively through bevel gear pairs 114, 115 and 116, 117. The shaft 84 is driven from shaft 111 through bevel gears 118, 119, a vertical shaft 120, bevel gears 121, 122, a shaft 123 and spur gears 124, 125, the shaft 120 being hidden from direct view in Fig. 1 by certain telescopic covers 120a.

Each of the spindle units 7, 8 is manually vertically adjustable by the means of a crank (not shown) applied to the squared ends of the shafts 126 or 127, Figs. 1, 3. Shaft 127 is connected for movement of unit 8 through bevel gears 128, 129 and a screw 130 which engages a nut 131, Fig. 12, fixed with the carrier 102. Shaft 126 is connected with unit 7 through similar gear and screw means as shown in Fig. 3.

Each of the units 9, 10 is manually horizontally movable on rail 6 by the means of a crank (not shown) applied to the squared ends of the cross screws 132, 133, Figs. 1, 3, which are journaled in rail 6. The screw 132 engages a nut 134, Fig. 10, fixed with the carrier base 59 of unit 9 and screw 133 engages a similar nut (not shown) fixed with the carrier base of unit 10.

Figure 14:
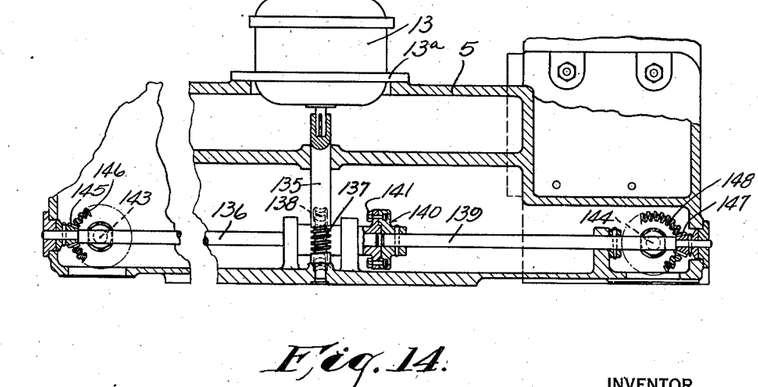
Fig. 14 is an enlarged partial top view, mainly in section, of the upper portion of the structure shown in Fig. 1, the lower portions and spindle units being omitted.

Transmission mechanism is provided for vertical movement of the rail 6, Fig. 1, together with the spindle units 9, 10 carried thereby, as follows: The motor 13, Figs. 1, 14, which in this instance is electrical, is fixed on the frame member 5 by a flange 13a, and drives a shaft 135 suitably connected to the motor shaft. A shaft 136 is driven from shaft 135 through a worm 137 and wheel 138, as also is a co-axial shaft 139 which is angularly adjustable relative to shaft 136 by a coupling device 140 having adjustable T bolts 141. Shafts 136, 139 respectively drive vertical screws 143, 144, Figs. 1, 14, through the bevel gear pairs 145, 146 and 147, 148, the screws 143, 144, respectively engaging nuts (not shown) fixed in opposite ends of the rail 6. The screws 143, 144 may be relatively adjusted for initially leveling the rail 6 by the means of the angular adjustment provided in the coupling 140.

The rail 6 is provided at each end with guide and clamp means cooperating with the side frame members 3, 4. The guide and clamp means may be of any suitable form but in this instance are similar at each end of the rail to the guide and clamp means shown in Fig. 12 for the spindle unit 8.

Figure 15:
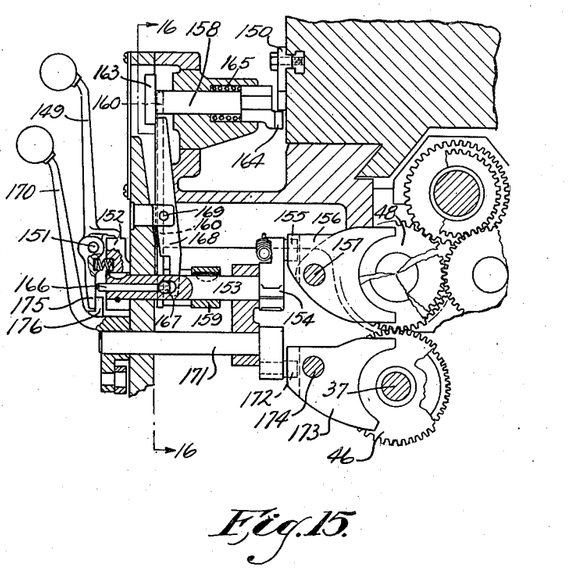
Fig. 15 is a partial view in vertical section taken approximately on the line 15—15 of Fig. 2 and enlarged.
Figure 16:
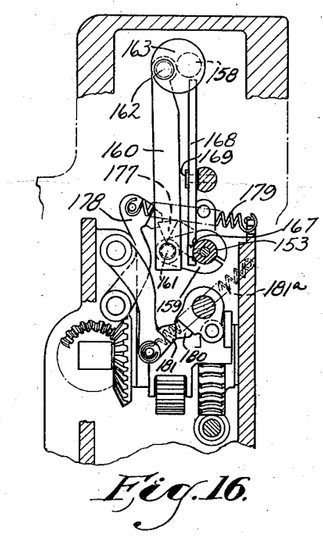
Fig. 16 is a partial view in vertical section taken approximately on the line 16—16 of Fig. 15.

The table transmission reverser and interruptor clutch member 49, Fig. 4, may be manually shifted into either direction of engagement or out of engagement by a hand lever 149, Figs 1, 15 and may also be shifted out of either engagement by a table dog such as dog 150, Fig. 15. The lever 149 is pivoted at 151 in a member 152 which is fixed on a shaft 153 upon which is also fixed a lever 154 having a pin portion 155 engaging a fork member 156 guided on a rod 157 and engaging the gear 48, Figs. 4, 15, between the arms of the fork member. The shaft 153 is also connected for rotation with a trip post 158 through a lever 159, Figs. 15, 16, and a rod member 160 which is pivoted with lever 159 at 161, and at 162 is pivoted with a member 163 fixed on the trip post 158. The trip post 158 has fixed therewith an eccentric element 164 which, as the lever 149 is shifted to engage the reverser clutch member 49 in either direction, is swung into the path of movement of the dog 150, and the dog, upon subsequent movement of the table contacts the element 164 to return the clutch member to disengaged position.

When the dog 150, Fig. 15 has contacted and shifted the eccentric trip element 164, the table is stopped, and can not then be started again in the same direction by power so long as the element 164 remains in contact with the dog, such contact preventing movement of the lever 149 to re-engage the reverser clutch 49 in the same direction, although it can be engaged in reverse direction because such engagement moves the element 164 away from the dog. To permit immediate power movement of the table in the same direction after dog tripping, the eccentric member 164 is arranged to be temporarily withdrawn from the path of the dog by the following means. Trip post 158 is normally held in the position of Fig. 15 by a spring 165 but may be moved axially to the left against the resistance of the spring by a movement of the lever 149 about the pivot 151, the lower end of the lever contacting a slidable pin 166, which contacts at its other end with a pin or element 167 extended through a slot in shaft 153 and fixed on one end of a lever 168 pivoted at 169 and operatively engaging the member 163 at its upper end. Release of the lever 149 returns the post 158 and trip element 164 to normal position to be contacted again by the table dog 150.

The table transmission feed and quick traverse clutch member 45, Fig. 4, may be manually shifted to drive table 1 at either feed or quick traverse rate by the means of a hand lever 170, Figs. 1, 15, which is fixed on a shaft 171 having an eccentric pin member 172 fixed therewith and engaging a slot in a fork member 173, guided on a rod 174, and engaging the end faces of the gear 46.

Means are provided for preventing the previously described power re-engagement of table drive in the same direction after an automatic trip, at such times as the hand lever 170 is in the position effective for quick traverse. This consists of the interference elements 175, 176, respectively, swinging with the levers 149 and 170. When the lever 170 is in quick traverse position, the element 176 occupies a position of interference with the element 175 preventing pivotal movement of lever 149 about the pivot 151. In the other, or feed position of lever 170 the lever 149 is not blocked.

Detent means are provided to define the several positions of the levers 149, 170, Fig. 15, and to yieldingly retain the levers in the positions to which they are shifted. For the lever 149 the detent means includes a cam member 177, Fig. 16, fixed with the member 154 and which cooperates with a pivoted element 178, the elements being urged together by a spring 179. For the lever 170 the detent means includes a cam member 180, Fig. 16, fixed with the right hand end, Fig. 15 of shaft 171, and cooperating with a pivoted member 181 urged by a spring 181a.

In addition to the interconnection of controls preventing operation of the table at quick traverse rate at certain times, as previously described, there are provided certain other inter-relations and interconnections of transmission and control mechanism. Certain of this control mechanism can be used in a variety of forms or will take various forms depending upon the nature of the power supply, as for instance whether the power supply source is mechanical, hydraulic or electrical, and depending upon the type of current available for the electric motors such as here shown. For these reasons the drawings, Fig. 17, relating to the interconnection of controls, are diagrammatic.

Figure 17:
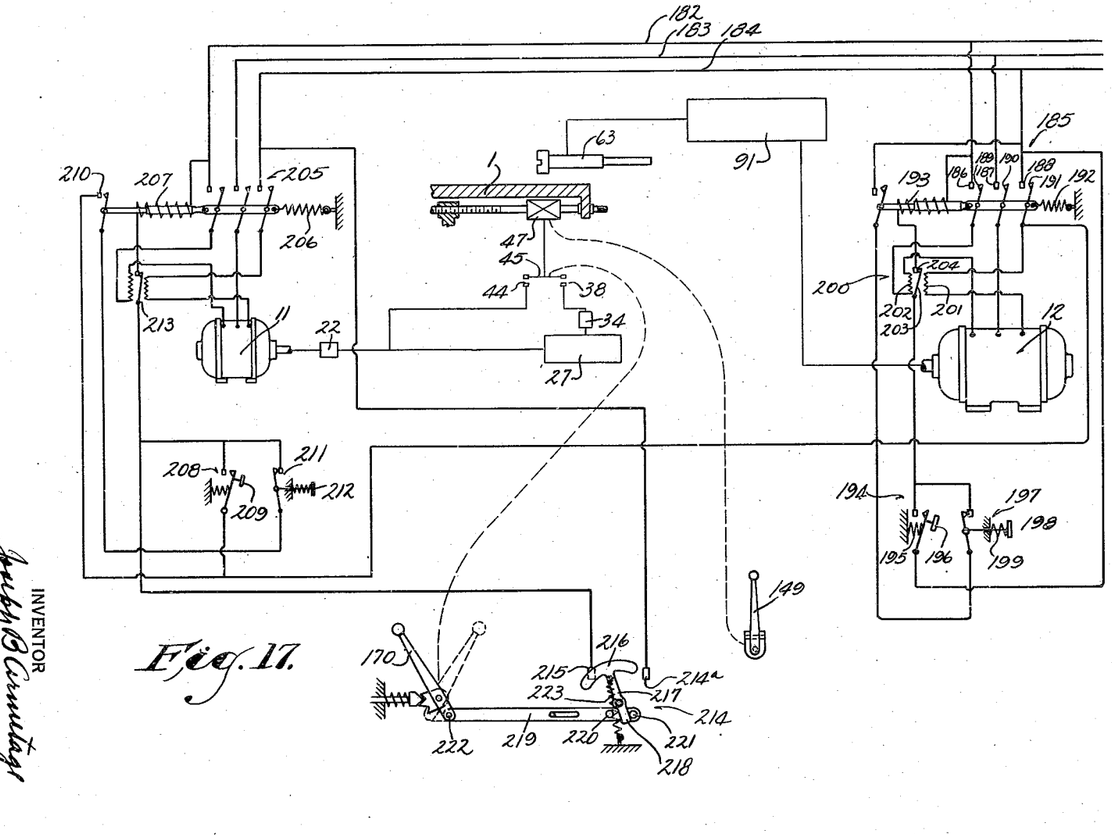
Fig. 17 is a diagrammatic showing of certain control and transmission mechanism of the machine, and of certain interconnections thereof which exist in the machine.

In the diagram, Fig. 17, the motors 11, 12 used for purposes of illustrating the invention, are electrical in nature and of a type requiring a three wire current supply line comprising the line wires 182, 183, 184. Also in Fig. 17 the other portions of the table and spindle transmissions previously described are diagrammatically represented by a limited number of their elements. Thus the transmission from motor 11 to table 1 shows the feed rate changer 27 and the feed rate terminal clutch element 38, the quick traverse rate terminal element 44, the rate selective clutch member 45, the reverser 47 and the two safety devices 22, 34, all connected in the relative train positions previously explained, together with the feed and quick traverse selective lever 170 and the reverser control lever 149 which are shown connected to the parts controlled thereby by dotted lines.

Also in Fig. 17 the connection of the spindle motor 12 to a representative spindle, which might be the spindle 63 of the spindle unit 9, or any of the spindles of the various spindle units 7, 8, 9, 10, is shown, including the reverser and rate changer 91 of Fig. 8.

The motor 12, Fig. 17, is supplied with line current through a control switch generally denoted by the numeral 185 including three live contacts 186, 187, 188 and three movable contacts such as 189, 190, 191, which are connected for simultaneous movement in a direction to open the switch 185 by a spring 192, and for opposite movement, to close switch 185, by a solenoid 193. Current to actuate solenoid 193 is derived from the line in the first instance, to start motor 12, through a switch generally denoted by the numeral 194, which is normally held open by a spring 195 but may be closed by a manually movable member 196, whereby the solenoid 193 is energized, and the switch 185 is closed and motor 12 starts spindle rotation. When the solenoid 193 is energized it closes an auxiliary switch thereby completing a holding circuit which provides another path for current to energize solenoid 193, and the switch 194 may then be released by the operator without de-energizing the solenoid. Motor 12 therefore continues to run, but the solenoid can be later de-energized to stop the motor at any time by opening a switch 197 in the holding circuit by the means of a manually movable member 198, this switch being normally held closed by a spring 199.

An overload safety device, generally denoted by the numeral 200, is provided for motor 12, as follows, current to the motor passes through heating elements 201, 202, with which is associated a thermostatic element 203 which, when heated beyond a certain temperature, operates a switch 204 to an open position. The switch 204 is in the supply line of the solenoid 193, and when the switch is opened the solenoid is de-energized. This opens switch 185 to stop the motor 12 and the motor cannot be started again except by manual operation of switch 194 as previously described.

Similarly operative control means are provided for the table motor 11, consisting of a main motor supply switch 205, Fig. 17, which is opened by a spring 206 and closed by a solenoid 207, the solenoid being initially energized to start the motor by closing a normally open switch 208, operative to closed position by a manually movable member 209. Following this the solenoid is energized, during motor operation, through a solenoid operated switch 210, and may be later de-energized to stop the motor by opening a normally closed switch 211, by the means of a manually operable member 212. The solenoid 207 for motor 11 is also energized through an overload safety device 213 similar to the device 200.

The current through the switches 208, 209, 210 to operate the solenoid 207, whereby to initially close and later control the main switch 205 of table motor 11, is normally derived from the main line through the switch 185 of the spindle motor 12, as indicated by the supply line connections in Fig. 17. As a result of this interconnection of controls the table transmission through motor 11, is subject to the operation of each of the control devices of the spindle transmission through motor 12. Thus the table 1, except as later pointed out, cannot be actuated from motor 11 except when the motor 12 is running. Also, if the spindle transmission is stopped, either by the switch 197 or the overload device 200 the table transmission is likewise stopped, and if thus stopped, a subsequent starting of the spindle transmission will simultaneously start the table transmission. At the same time the table transmission is subject to all of the control devices previously mentioned including the mechanical control levers 149, 170, the overload devices 22, 34 and the rate changer 27, as well as the switches 208, 211 and the overload device 213.

One reason for the described interconnection of table and spindle control devices is to prevent operation of the table at a feed rate when the spindle transmission is not running. The feed rate may be relatively very slow in some of the adjustments of rate changer 27, and the operator might then, unless prevented inadvertently leave the transmission engaged to feed a work piece against a non-rotating cutter, thereby damaging or breaking the machine.

Such considerations for various reasons do not affect the use of table rapid traverse rate when the spindle is not rotating. In this case the table rate is invariably so rapid that the operator will not inadvertently leave it engaged. It is very desirable for various reasons that table rapid traverse should be available whether the spindles are or are not rotating. To effect that result the controls for motor 11 are interconnected with the lever 170, Fig. 17 in such manner that the solenoid 207 is energized to close motor switch 205 at all times when the lever 170 is in its quick traverse position, as follows:

A switch generally denoted by the numeral 214, Fig. 17, includes a contact 214a connected to the main line conductor 184 in manner to exclude the spindle motor control mechanism and a contact 215 connected to the solenoid 207 in manner to exclude each of the several table motor control switches 208, 210, 211, but to include the overload device 213. A bridging element 216 is connected for movement from lever 170, the element being fixed on a pivoted lever 217 having an end 218 operative from a rod or bar 219 through a lost motion connection including the spaced apart contact pins 220, 221 fixed on rod 219, the rod being pivoted with the lever 170 at 222. A spring 223 operates to urge the lever end 218 against the one or the other pin 220, 221 during the first portion of movement of lever 170 in either direction, but at about the intermediate point of lever movement the spring crosses the center of the pivot of lever 217 and then quickly completes the movement of the bridge element 216.

The arrangement just described is such that, as the lever 170 is moved from feed to quick traverse position the bridge member 216 completes the circuit to solenoid 207 through switch 213 after the clutch member 45 disengages from feed terminal element 38, and before the clutch member 45 is fully engaged with the quick traverse terminal member 44. In the opposite lever movement, the circuit through switch 214 is maintained closed during the first part of the movement of lever 170 toward feed position, but is opened again before the clutch member 45 reaches a position to engage the feed terminal element 38.

As a result of the action just described the table transmission motor 11 may run during quick traverse position of lever 170, irrespective of the controls previously described, excepting only the control from the overload device 213, but without altering the effect of the interconnection of control means which prevents the operation of the table 1 at feed rate when the spindle motor 12 is not running.

Figure 2:
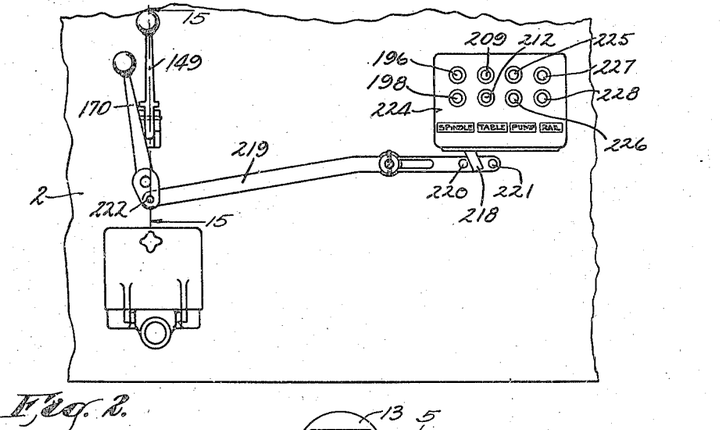
Fig. 2 is an enlarged partial view in front elevation of the same machine viewed from the left of Fig. 1, showing the mounting of certain control mechanism on the bed of the machine adjacent to the operator's position.

The primarily manually operable elements of the control mechanism described are arranged at the operator's position and in a form for convenient manipulation. Referring to Fig. 2, the levers 149 and 170 are mounted on base 2 at a point adapted for manipulation by the operator when in best position for observation of the work and tools. Closely adjacent to the right hand of the operator is a control panel generally denoted by the numeral 224, upon which are mounted the manually operable switch elements 196, 198, 209, 212.

Other control elements, such as switch operating elements 225, 226 for a pump motor (not shown) and the switch operating elements 227, 228 for the rail operating motor 13 are also mounted on panel 224. The elements 227, 228 operate a main switch and control solenoid (not shown) for motor 13 which are similar to the switch 185 and solenoid 193 for motor 12, and which are similarly controlled from switches, (not shown) corresponding to the switches 194, and 197.

I claim:

1. In a machine tool including a bed and a plurality of elements each movably supported on said bed, the combination of a transmission for movement of one of said elements including a power operable motor constituting a primary motion source, a transmission for movement of the other of said elements including a second power operable motor constituting a second primary motion source, control means including a main power switch operative for alternative connection and interruption of power to the first mentioned motor, other control means individually operable for alternative connection and interruption of power to said second motor, and relay switch means deriving power through said main power switch and operative for interrupting the power connection to said second motor when the power connection to the other motor is inoperative.

2. In a milling machine having a main supporting structure and a reciprocatory work support carried thereby; the combination with a tool spindle supporting unit including a base guided for bodily movement on said main supporting structure, a member supported on said base for pivotal movement relative thereto, and a tool spindle rotatably carried by said pivoted member and bodily movable therewith in cooperating relationship with said work support; of mechanism for rotating said spindle including a source of power carried by said main supporting structure, constant speed transmission mechanism disposed to transmit power at a substantially constant relatively high speed from said source to said pivoted member, and a rate changer carried by said pivoted member for bodily movement therewith and operative to transmit power from said constant speed mechanism to said spindle at a selected one of a plurality of rates, whereby said spindle may be operated at low speed and high torque without subjecting said constant speed transmission mechanism to high torque thereby avoiding deflection of said mechanism and vibration of said spindle.

3. In a milling machine having a bed, a work supporting table reciprocably mounted on said bed, and a pair of spindle supporting members fixed with said bed and uprising respectively at opposite sides of said table; the combination with a rail guided on said uprising members above said table and arranged for vertical movement relative thereto, a tool spindle supporting unit including a base slidably mounted on said rail for bodily movement relative thereto, and a tool spindle rotatably carried by said base for bodily movement therewith in cooperative relationship with said work table; of mechanism for driving said spindle including a power source carried by said bed, a transmission mechanism disposed to transmit power from said source to said movable base at a substantially constant relatively high speed, and a rate changer carried by said base in manner to move bodily therewith and operative to transmit power from said constant speed mechanism to said spindle at a selected one of a plurality of rates, whereby vibration of said spindle is obviated by avoiding transmission of power to said base at low speed and high torque.

4. In a milling machine having a main supporting structure and a reciprocatory work support carried thereby, the combination of a spindle unit including a base guided for bodily movement on said structure in a direction transverse to the path of table movement, a pivoted member carried by said base for movement on an axis substantially parallel with the path of movement of said table, another member carried by said pivoted member for movement in a path transverse to table movement, a tool spindle rotatably journaled in the last mentioned member, and a transmission for rotation of said spindle including a driving source carried by said supporting structure, a shaft driven from said source and axially coincident with the axis of said pivot and a rate changer carried by said pivoted member and driven from said shaft.

5. In a milling machine the combination of a main support structure including a bed, a table guided on said bed for horizontal reciprocatory movement, said main support including a plurality of spindle support members uprising respectively at opposite sides of said table, a rail guided on said members for vertical movement transverse to table movement, a spindle unit including a base guided on said rail for horizontal movement transverse to table movement, a member pivoted on said base for movement about an axis substantially parallel to table movement, a spindle carried by said member for rotation on an axis transverse to table movement, and a transmission for rotation of said spindle including a power shaft axially coincident with said pivot axis and a rate changer carried by said pivoted member and driven through said shaft.

6. In a milling machine the combination of a main support structure including a bed, a table guided on said bed for horizontal reciprocatory movement, said main support including a plurality of spindle support members uprising respectively at opposite sides of said table, a rail guided on said members for vertical movement transverse to table movement, a spindle unit including a base guided on said rail for horizontal movement transverse to table movement, a member pivoted on said base for movement about an axis substantially parallel to table movement, another member guided by said pivoted member for movement transverse to table movement, a spindle carried by the last mentioned member for rotation on an axis transverse to table movement, and a transmission for rotation of said spindle including a power shaft axially coincident with the axis of said pivoted member, and a spindle rate changer driven from said shaft and carried by said pivoted member.

7. In a milling machine the combination of a supporting structure including a bed, a work table guided on said bed for reciprocatory movement, a plurality of spindle units each including a base member guided for bodily movement on said structure in a direction transverse to the path of table movement, each of said units including a tool spindle rotatably carried by said base and disposed axially transverse to the path of table movement, transmission mechanism for said reciprocatory table movement, and transmission mechanism for rotation of said spindles including for each spindle a rate changer carried by the unit base associated therewith, and bodily movable with said base and spindle and adjustable to effect rotation of said spindle at any one of a plurality of rates.

8. In a milling machine the combination of a supporting structure including a bed, a work table guided on said bed for reciprocatory movement, a plurality of spindle units each including a base member guided on said structure for bodily movement in a path transverse to the path of table movement and each including a tool spindle carried by said base member for rotation on an axis transverse to the path of table movement, transmission mechanism for said reciprocatory table movement including a rate changer and reversing means, and transmission mechanism for rotation of said spindles including first and second reversing means respectively individual to the different spindle units and respectively carried by the different of said base members for bodily movement therewith.

9. In a milling machine the combination of a supporting structure including a bed, a work table guided on said bed for reciprocatory movement, a plurality of spindle units each including a base member guided on said structure for bodily movement in a path transverse to the path of table movement and each including a tool spindle carried by said base member for rotation on an axis transverse to the path of table movement, transmission mechanism for said reciprocatory table movement including rate change and reversing means, and transmission mechanism for rotation of said spindles including for each spindle rate change and reversing means individual thereto and carried by the base member associated therewith for unitary bodily movement with the base member and spindle.

10. In a milling machine the combination of a supporting structure including a bed, a table reciprocably guided on said bed, a spindle unit including a base guided on said structure for bodily movement transverse to the path of table movement, said unit including a spindle supported from said base for rotation on an axis transverse to the path of table movement, a transmission for said table; and a transmission for said spindle including a plurality of oppositely rotatable shafts and a driven shaft each carried by said base in axially parallel spaced arrangement, and gearing interchangeably mountable on said shafts to drive said driven shaft from the one or the other of said oppositely rotatable shafts, whereby to actuate said spindle in either direction of rotation.

11. In a milling machine the combination of a supporting structure including a bed, a table reciprocably guided on said bed, said structure including a plurality of spindle support members uprising from said bed on opposite sides of said table respectively, a plurality of tool spindles each rotatably supported from said structure at a level above said table and axially transverse to the path of table movement, a plurality of independently power operable motors each supported from said structure, a table transmisison driven from one of said motors, a plurality of spindle transmissions respectively for different of said spindles and each driven from the other of said motors; and control devices for said transmissions including a spindle transmission controller and a table transmission controller respectively for alternative connection or disconnection of power to said table and to said spindles, said controllers being independently operable, means interconnecting said control devices to render the table transmission controller inoperative for said power connection when the spindle transmission controller is in power interrupting position, other independently operable control means operable to alter the motion transmitting connection of said table transmission, and means operative from the last mentioned control means and operable to establish power connection to said table irrespective of the position of said spindle transmission controller.

12. In a milling machine the combination of a supporting structure including a bed, a table reciprocably guided on said bed, said structure including a plurality of spindle support members uprising from said bed on opposite sides of said table respectively, a plurality of tool spindles each rotatably supported from said structure at a level above said table and axially transverse to the path of table movement, a plurality of independently power operable motors each supported from said structure, a table transmission including a feed rate branch line, a quick traverse rate branch line and means selectively shiftable to connect the one or the other of said branch lines to actuate said table, said feed rate branch line including a feed rate changer, and said branch lines being alternatively connectible to actuate said table from one of said motors, a plurality of other branch lines respectively individual to different of said spindles and each connected for operation from the other of said motors; and control devices for said transmissions including a spindle transmission controller and a table transmission controller respectively for alternative connection or disconnection of power to said table and to said spindles, said controllers being independently operable, interconnecting means effective to render said table transmission controller inoperative for said power connection when the spindle transmission controller is of power interrupting effect, a third independently operable controller shiftable for said alternative connection of feed rate and quick traverse rate branch lines, and means operative only in the quick traverse connecting position of said third controller to establish power connection to drive said table irrespective of the effect of said interconnecting means.

13. In a milling machine the combination of a base, a tool spindle rotatably supported from said base, a work table supported from said base for reciprocatory movement in a direction transverse to the spindle axis, a plurality of power operable motors each supported from said base, a spindle transmission connectible from one of said motors for rotation of said spindle and including a spindle rate changer, a table transmission including a feed rate branch line and a quick traverse rate branch line and means shiftable for alternative connection of said branch lines to actuate said table, said feed rate branch line including a feed rate changer and each of said branch lines being connected for actuation from the other of said motors; and control devices for said transmissions including a spindle transmission controller and a table transmission controller respectively for alternative connection or disconnection of power to operate said spindle and to operate said table, said controllers being independently operable, means adapted to render said table transmission controller inoperative for power connection when said spindle transmission controller is in power interrupting position, a third independently operable controller for operation of said shiftable means to alternative feed or quick traverse rate connection, and means operative only in the quick traverse rate position of said third controller to establish a power connection to drive said table.

14. In a milling machine the combination of a base, a tool spindle rotatably supported from said base, a work table supported from said base for reciprocatory movement in a direction transverse to the spindle axis, a plurality of power operable motors each supported from said base, a spindle transmission connectible from one of said motors for rotation of said spindle and including a spindle rate changer, a table transmission including a feed rate branch line and a quick traverse rate branch line and means shiftable for alternative connection of said branch lines to actuate said table, said feed rate branch line including a feed rate changer and each of said branch lines being connected for actuation from the other of said motors; and control devices for said motors including a plurality of independently operable controllers respectively for alternative connection or disconnection of power to operate the different motors, another independently operable controller for shifting said shiftable means to alternative feed or quick traverse position, and means operative from said other controller to effect a power connection to said table motor transmission whenever said other controller is in quick traverse rate position.

15. In a milling machine the combination of a base, a tool spindle rotatably supported from said base, a work table supported from said base for reciprocatory movement in a direction transverse to the spindle axis, a plurality of power operable motors each supported from said base, a spindle transmission connectible from one of said motors for rotation of said spindle and including a spindle rate changer, a table transmission including a feed rate branch line and a quick traverse rate branch line and means shiftable for alternative connection of said branch lines to actuate said table, said feed rate branch line including a feed rate changer and each of said branch lines being connected for actuation from the other of said motors; and control devices for said transmissions including a plurality of independently operable controllers respectively for alternative connection or disconnection of power to said table and to said spindle, another independently operable controller for shifting said shiftable means to alternative feed or quick traverse position, and means operative to control the power connection to operate said table in accordance with the position of said other controller.

16. In a machine tool including a bed and a plurality of elements each movably supported on said bed, the combination of a transmission for movement of one of said elements including a power operable motor constituting a primary motion source, a transmission for movement of the other of said elements including a second power operable motor constituting a second primary motion source, control means operative for alternative connection and interruption of power to the first mentioned motor, other control means individually operable for alternative connection and interruption of power to said second motor, means interrupting the power connection to a predetermined one of said motors when the power connection to the other motor is interrupted, and another independently operable control means operative to effect a power connection to said predetermined motor irrespective of said interrupting means.

17. In a machine tool the combination of a rotatable spindle, a support, said spindle and support being relatively bodily movable, a transmission for rotation of said spindle including a first power operable primary motion source, a transmission for said bodily movement including a second power operable primary motion source; and control means for said transmissions including a plurality of independently operable controllers respectively for alternative connection and interruption of power to said spindle and to said support, means preventing the operation of the support controller to effect a power connection when the spindle controller is in power interrupting position, and another independently operable controller for establishing a power connection from one of said motors to said support irrespective of said interrupting means.

18. In a milling machine the combination of a base, a tool spindle rotatably supported from said base, a work table supported from said base for reciprocatory movement in a direction transverse to the spindle axis, a plurality of power operable motors each supported from said base, a spindle transmission connectible from one of said motors for rotation of said spindle and including a spindle rate changer, a table transmission including a feed rate branch line and a quick traverse rate branch line and means shiftable for alternative connection of said branch lines to actuate said table, said feed rate branch line including a feed rate changer and each of said branch lines being connected for actuation from the other of said motors; and control devices for said motors including a spindle transmission motor controller and a table transmission motor controller respectively for alternative connection or disconnection of power to operate the spindle and table motors, said controllers being independently operable, means adapted to render said table transmission motor controller inoperative for power connection when said spindle transmission motor controller is in power interrupting position, a third independently operable controller for operation of said shiftable means to alternative feed or quick traverse position, and means operative only in the quick traverse position of said third controller to establish a power connection to drive said table transmission motor irrespective of said interrupting means.

19. In a milling machine the combination of a base, a tool spindle rotatably supported from said base, a work table supported from said base for reciprocatory movement in a path transverse to the spindle axis, a plurality of electric motors each supported from said base, a spindle transmission connectible from one of said motors and including a spindle rate changer, a table transmission including a feed rate branch line and a quick traverse rate branch line and means shiftable for alternative connection of said branch lines to drive said table, said feed rate branch line including a feed rate changer, and each of said branch lines being connected for actuation from the other of said motors, an electric power line; and control devices for said transmissions including a first controller for shifting said shiftable means, a plurality of switch means respectively for alternatively connecting or disconnecting said power line to the different motors, and control means for the table transmission motor switch means including means operative to deenergize said table transmission motor when the spindle motor switch means is open and the shiftable means is concurrently in position to connect said feed rate branch line.

20. A milling machine as specified in claim 19 including other control means operative in accordance with the operation of said first controller to close the table transmission motor switch means when said first controller is in quick traverse position.

21. In a milling machine the combination of a reciprocatory table, a rotatable tool spindle, a spindle transmission including an electric motor means, a table transmission including means operable for actuation of said table alternatively at a quick traverse rate or at a relatively slow feed rate and including other electric motor means, an electric power line, switch means for alternatively connecting or disconnecting each of said motor means with said power line, means preventing connection of said table to be actuated at said feed rate when said power line is disconnected from said spindle motor means, and other control means for connecting said other motor means to actuate said table at a quick traverse rate irrespective of the connection of said spindle motor means.

22. In a machine tool having a rotatable tool spindle and a work support mounted in cooperating relation therewith for movement relative thereto, the combination with a motor operatively connected to drive said spindle, another motor for driving said work support, and a transmission mechanism operatively connecting said work support motor to said work support, said mechanism being adjustable in manner to move said work support selectively at either feed rate or rapid traverse rate; of control mechanism for said motors including means operative to stop said work support motor upon stopping of said spindle motor when said transmission mechanism is adjusted to operate at feed rate, and means operative to effect energization of said work support motor independently of said spindle motor when said transmission mechanism is adjusted to effect operation of said work support at rapid traverse rate.

JOSEPH B. ARMITAGE.